Aug. 11, 1942.    D. G. BRANDT    2,292,350
HEAT EXCHANGE APPARATUS
Filed Aug. 2, 1940
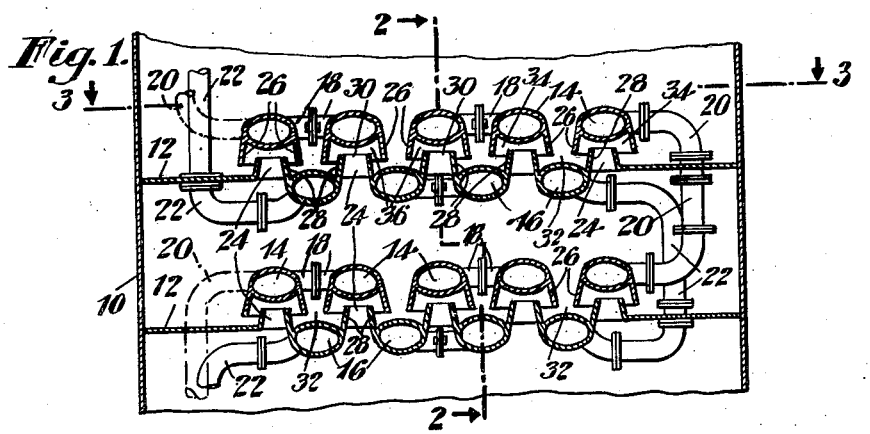
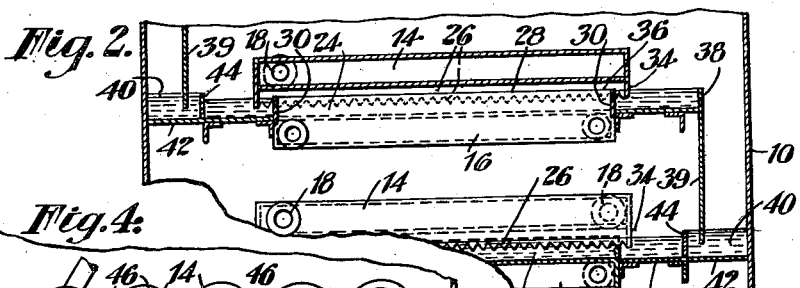
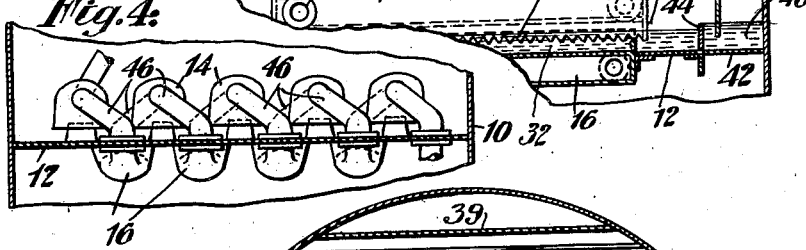
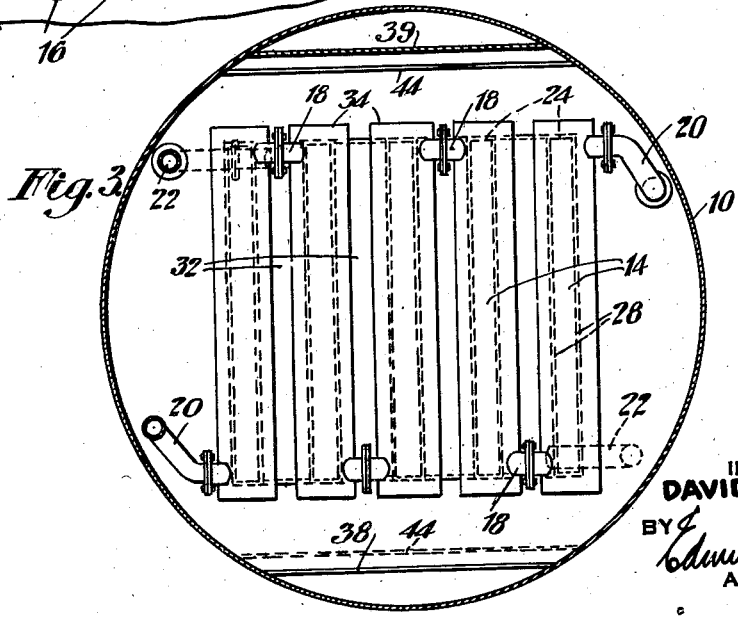
INVENTOR
DAVID G. BRANDT
BY
ATTORNEY Patented Aug. 11, 1942

2,292,350

UNITED STATES PATENT OFFICE 2,292,350

HEAT EXCHANGE APPARATUS

David G. Brandt, Westfield, N. J., assignor to Cities Service Oil Company, New York, N. Y., a corporation of Pennsylvania Application August 2, 1940, Serial No. 349,613

12 Claims. (Cl. 261—12)

This invention relates to improvements in means for promoting heat exchange between gases or vapors and liquids. The invention is particularly directed to the problem of increasing the efficiency with which mixtures of fluids of different boiling points may be formed and resolved. The invention has particular application to such operations as the fractional separation of vapors of liquid mixtures such as petroleum; formation and resolution of liquid solutions of gases such as aqueous ammonia; and in general all operations in which a gas or vapor is brought into intimate contact with a higher boiling liquid solvent with simultaneous absorption or liberation of heat.

The primary object of the invention is to improve the efficiency of heat exchange operations of the type in which a flowing stream of gas or vapor is passed longitudinally through a tower in heat exchange relation, at a plurality of vertically spaced zones, with a counterflow stream of liquid.

One type of apparatus commonly employed for carrying out gas and liquid contact operations wherein a problem of heat exchange is also involved, is that generally known as a bubbler tower. Bubbler towers are particularly adapted to effect intimate contact, at a plurality of vertically spaced zones, between an upwardly flowing stream of hot gas or vapor and a countercurrent stream of a cooler liquid with which the gas or vapor is at least partially miscible. At each contact zone the gas or vapor is allowed to bubble upwardly through a shallow body of liquid trapped on a tray.

The fractionating efficiency of the usual form of bubbler tower operating under normal capacity depends upon the relative temperatures of the gas or vapor and liquid at each contact zone, and on the net amount of heat absorbed or liberated during each period of contact. The fractionating efficiency also depends on the time of contact; on the area of contact or relative size and distribution of the gas bubbles; and on the depth of the zones of froth and mist above the liquid on the tray. The efficiency of the common form of bubbler tower diminishes on any attempt to increase or decrease the capacity appreciably.

Another object of the present invention is to improve the efficiency of gas and liquid contact operations of the bubbler tower type. A more specific object is to provide improvements whereby to maintain the efficiency of the operation of bubbler tower contact units over a wide range of capacity.

With the above objects in view, a gas and liquid contact tower when designed to embody the structural improvements of the present invention, should include a series of vertically spaced bubbler trays each embodying as its principal structural elements a plurality of heat exchange conduits disposed in vertically and horizontally spaced relation and provided with external heat exchange fins so arranged as to form with the conduits properly positioned and spaced liquid-supporting trays, vapor risers, and bubble caps. A third heat exchange fluid of controlled temperature can then be circulated at controlled velocity through such conduits in efficient indirect heat transfer relation to bodies of liquid on the trays and to the gas or vapor streams approaching, passing through and leaving each contact zone.

Another object of the invention is to provide a design of integral bubble tray-heat exchange coil structure which will meet the above stated requirements and which at the same time will be simple and economical, easily constructed and repaired, of great mechanical strength and stiffness, and adapted for compact multiple tray assembly.

Other objects, features and advantages of the present invention will be apparent to those skilled in the art from the following more detailed description thereof, and from the accompanying drawing, which illustrates the invention in connection with a cylindrical tower.

In the drawing:

Fig. 1 is a vertical sectional view of a broken portion of a bubbler tower showing an assembly of externally finned heat exchange conduits arranged and designed to form liquid supporting trays, vapor risers and bubble cap elements in accordance with the present invention.

Fig. 2 is a cross-sectional view of a portion of the apparatus shown in Fig. 1, taken on the line 2—2.

Fig. 3 is a plan view of the apparatus shown in Fig. 1, looking down from above the figure.

Fig. 4 is a fragmentary view in end elevation of a bubble tray section illustrating a different method of interconnecting the heat exchange conduits. In all of the figures of the drawing, like reference characters refer to the same or corresponding parts of the apparatus.

Referring to the drawing, the cylindrical shell of a contact tower is designated 10. A series of bubbler trays 12 are mounted within the tower, and are supported by any of the conventional means. Each bubbler tray structure is assembled from a plurality of vertically and horizontally spaced tubular conduits 14, 16, disposed in two vertically spaced horizontal coils; the conduits in each coil being connected in series by lateral tubes 18, and each coil being in turn connected with similar coils of other trays by tubular connections 20, 22. Adjacent conduits or legs in a coil are preferably spaced horizontally a distance not substantially exceeding half the diameter of the conduit measured on its horizontal axis, and each conduit 14 in the upper coil is preferably located directly above a space 24 between adjacent conduits 16 in the lower coil. Each of the conduits 14 in the upper coil is provided with a pair of external longitudinal fins or skirts 26 which project downwardly from opposite sides thereof to form a member of generally A-shaped cross-section. Likewise each of the conduits 16 in the lower coil is provided with a pair of external longitudinal fins 28 which extend upwardly from opposite sides thereof to form a second member of generally A-shaped cross-section but inverted. The passages 24 thus formed between the adjacent fins 28 of each pair of conduits in the lower bank comprise elongated slot-like vapor risers for a tray unit. End walls 30 of the vapor risers are formed by laterally projecting fins of adjacent conduits 16 joined together, as by bolting or welding. The upper external surface of each conduit 16 in the lower bank forms, together with the fins 28 extending upwardly therefrom, an elongated liquid-supporting trough or tray 32. Likewise, the bottom external surface of each conduit 14 in the upper bank forms, in conjunction with depending side skirts 26 and transverse end skirts 34, an elongated hood or bubble cap 36 mounted in vertically spaced and aligned position over each vapor riser.

In addition to the liquid supporting trays or troughs, vapor risers and bubbler caps, each bubbler tray structure includes an overflow weir 38 which is provided with a depending skirt 39 extending downwardly to a point below the level of liquid on the next lower tray of the tower 10. Any liquid which overflows a weir on one tray drops into a trap or well 40 on the tray below, which is formed by the side of the tower together with a base plate 42 and an overflow plate 44. The ends of the weir 38 and its depending skirt are sealed against the sides of the tower. The construction is such that as reflux liquid flows into the traps 40, a liquid level will be developed in each trap outside the skirt 39 which is proportional to the drop in pressure of the vapors passing through the associated bubbler tray.

In the modified assembly of externally finned heat exchange conduits which is illustrated in Fig. 4, each of the conduits 14 in a top coil of a tray unit is shown as connected in series with an adjoining conduit 16 in the lower coil by transfer connections 46, so that the conduits 14 and 16 are all embodied as legs of a single heat exchange unit.

In operating the apparatus illustrated as a fractionating tower for rectifying petroleum vapors, it will be understood that hot vapor or gas rises in a generally upward direction through the tower while at the same time cool liquid condensate flows downwardly through the tower. The level of the liquid on each bubbler tray is fixed by the weirs 38. A definite relation of temperatures throughout the length of the tower should be maintained in accordance with the boiling points of the constituents to be fractionated or separated. By the present invention provision is made for internal independent temperature control of the liquid and vapor at each tray or contact zone. In a petroleum vapor fractionating operation, as well as in a gas absorption operation, this control is effected by circulating a cooling fluid such as water or oil downwardly through the heat exchange coils embodying conduits 14 and 16 making up each tray, in close indirect heat exchange relation to the upwardly flowing hot vapors and to the downwardly flowing reflux condensate. In rising from one tray to the next overlying tray in the tower, the vapors first impinge directly against the cooled external bottom surfaces of the conduits 16, whereby the vapors are deflected with increasing velocity into the restricted vapor risers 24 through which the vapor passes in continued contact with the cooling fins 28 of conduits 16. From the tops of the vapor risers the hot vapors are projected at high velocity against the cool external bottom surfaces of the overlying bubble cap conduits 14. The direction of the vapors is thus reversed, and they then pass downwardly between the cooled fins 28 and the cooled bubbler skirts 26, until they reach the bottom of the bubbler skirts and enter the cooling liquid in the troughs 32 through slots or serrations on the lower edges of the bubbler cap skirts. After bubbling upwardly through the cooling liquid on the trays, the rising hot vapors pass upwardly through slot-like passage between conduits 14 in continued heat transfer relation to the cooled skirts and walls of the conduits 14, after which the hot vapors are projected directly against the cool under surfaces of the conduit 16 in the overlying tray section.

By the present invention the hot gas or vapor can be brought into close heat transfer relation with a volume of liquid which may be several times the volume of liquid which the gas contacts directly on the trays. Furthermore, the gas is in direct contact with a cooling surface throughout a very substantial portion of its entire travel through the tower, and the rate of heat transfer may be very rapid, as liquid is circulating at a high velocity through the heat exchange conduits while simultaneously gas or vapor flowing at high velocity impinges directly against the exterior surfaces of said conduits and fins in its restricted flow path through the contact zone. By this method of operation the vapor approaching a contact zone is efficiently precooled and relieved of entrained condensate or mist carried upwardly from the tray below before it comes into contact with the liquid on the next tray above. Additional condensate thus formed during the precooling operation condenses in the zone of the bubble caps, or is trapped by the liquid on the tray before the vapors pass out of the bubblers. In this way the volume of reflux or condensate produced on a tray may be greatly increased during fractionation. Even the passing of the vapors leaving the liquid on a tray into contact with additional cooling surface is beneficial, in that it tends to prevent transfer of liquid by entrainment from one tray into the next higher tray and to stabilize the froth zone over the liquid on each tray, thereby further increasing the fractionating efficiency.

Because of its greater fractionating efficiency, a tower having trays built in accordance with the design of the present invention may be made much shorter and embody fewer trays than possible with prior towers of the same capacity previously employed in the art. Also because of the simplicity and compactness and strength of the tray construction, trays may be built of large diameter and with close vertical spacing between trays.

The tower design of the present invention has particular utility for promoting absorption of gas in a liquid, as for example ammonia in water. Circulation of a cooling fluid through the heat exchange coils removes heat rapidly from the contact zone, thereby cooling the contact liquid on the tray and increasing the solubility of the gas therein, whereby solutions of greater concentration can be produced, and a unit volume of gas can be absorbed in a smaller volume of liquid. The invention is also applicable with advantage to the problems of distillation, as for example to the evaporation of ammonia from solutions thereof. In this case, heat is supplied by circulating a heating fluid through the heat exchange elements of the tray structure in amounts sufficient to counter-balance the cooling effect of the evaporating ammonia.

In the drawing and in the foregoing description, the invention has been illustrated and described as applied to liquid-gas contact apparatus of the bubbler tower type. As previously indicated, however, the invention is broadly concerned with the problem of promoting efficient heat exchange within a tower between counter-flow streams of two or more fluids. Accordingly, this invention is not limited in application to operations in which a gas is brought into intimate contact with a liquid. From a pure heat exchange aspect, the invention has utility in such fields as air-conditioning, where the temperature of a stream of air is adjusted by indirect heat exchange with a second fluid such as steam or brine. For practicing a purely heat exchange operation of this type, apparatus such as illustrated in Fig. 1 may be modified by eliminating therefrom the weirs and liquid traps or other means for insuring direct contact between a gas and a counterflow liquid. In operating apparatus such as that of Fig. 1 when thus modified, as an air-cooling unit, a stream of air flowing upwardly through the column, on approaching a heat transfer zone from below, is broken up into a plurality of smaller air streams, each of which flows through the heat exchange zone at a velocity greater than that of the main stream. In flowing through the heat exchange zone the direction of flow of each small air stream is changed, and even reversed in direction at least twice, namely,—first by impingement against the bottom of a conduit 14, placed in baffling relation to further upward flow, with a later reversal caused by impingement on a conduit 16 placed in baffling relation to further downward flow. Throughout the entire flow path of the air or gas stream through such a heat exchange zone, it is in continuous heat transfer contact either with the walls of tubes 14 or 16, or with the skirts and fins attached longitudinally to the tube walls at each side, so that with this construction relatively rapidly-moving streams of air and brine or other fluid are maintained in indirect transfer relation along opposite sides of heat conductant diaphragms of substantial area.

While the column or tower has been described and shown as circular in cross-section, it may obviously be square or of any other shape. Furthermore, the heat exchange coils from which the bubble trays are constructed are not necessarily constructed of straight conduit legs, or assembled into rectangular trays, as illustrated. For example, the bubbler trays can just as well be assembled from externally finned tubes of hair pin or other curved shapes; and trays of annular shape may be built around a circular weir located in the vertical axis of the tower. The term "A-shaped" is intended to cover any variation in which a tubular conduit of any cross-section is provided with fins or skirts to give a member of the general form described and illustrated. Various other modifications may be made in the apparatus within the scope of the invention as defined by the claims.

Having thus described the invention in its preferred form, what is claimed as new is:

1. In a heat exchange tower adapted to effect indirect heat transfer between a fluid stream flowing upwardly through the tower and a heat exchange liquid flowing through the tower in a generally countercurrent direction, the improvement which comprises a plurality of vertically spaced heat exchangers within the tower each including a pair of vertically spaced heat transfer coils disposed horizontally in the tower, the upper coil of each pair comprising a series of horizontally spaced connected heat exchange conduits each having an external longitudinal skirt extending downwardly along each side thereof, the lower coil comprising a series of interconnected horizontally spaced conduits each having an external longitudinal fin extending upwardly along each side thereof, each of said conduits in the upper coil being mounted in vertically spaced relation over a space between adjacent conduits in the underlying coil with the lower edges of its skirts laterally spaced from and extending below the upper edge of adjacent fins so that said conduits with there depending skirts and upstanding fins form baffled passages of restricted cross section externally thereof for fluid passing upwardly through the tower.

2. A heat transfer section for liquid-gas heat exchange towers comprising, a horizontally positioned coil of communicably connected spaced heat exchange conduits, each of said conduits having an external upstanding longitudinal fin along each side thereof, fins of adjacent conduits forming side walls of a slot-like gas riser therebetween, and a second horizontally positioned coil of communicably connected spaced heat exchange conduits vertically spaced above the first coil, each conduit in said second coil being mounted directly over and spaced from the top of a gas riser and having an external longitudinal skirt projecting downwardly along each side thereof outside the walls of the gas risers and spaced therefrom; the conduits in the second coil forming with their skirts deflecting baffles whereby to break up and reverse the direction of flow of the gas streams flowing upwardly through the gas risers and direct such streams downwardly along the fins and skirts toward the top external surfaces of the conduits in the lower coil at each side of the gas risers.

3. A bubble tray structure for liquid-gas contact towers comprising a liquid supporting tray including a row of elongated trough members having their side walls spaced to produce a plurality of open-ended vapor risers therebetween, a row of elongated heat exchange conduits each having external longitudinal skirts extending downwardly along each side thereof, each of said conduits being mounted over a vapor riser so that the bottom thereof with its depending skirts constitutes a bubble cap having the lower edges of its skirts submerged in liquid maintained on the tray, means connecting the heat exchange conduits of the bubble caps into a heat exchange coil, and weir means for transferring liquid from said tray and for maintaining a predetermined liquid level thereon.

4. Apparatus as defined in claim 3 in which each trough member comprises a heat exchange conduit having an upstanding external longitudinal fin along each side thereof, together with means connecting said trough heat exchange conduits into a unitary heat exchange coil.

5. A bubble tray structure for liquid-gas contact towers comprising a row of horizontally positioned heat exchange conduits each having an external upstanding longitudinal fin along each side thereof, the top of each conduit forming with its fins a liquid-supporting trough, adjoining conduits being spaced apart to form vapor risers therebetween, another row of horizontally positioned heat exchange conduits each having an external longitudinal skirt projecting downwardly along each side thereof, each of the conduits in said second row being mounted over a vapor riser so that the bottom thereof with its depending skirts constitutes a bubble cap having skirts extending into the underlying troughs.

6. Apparatus as defined in claim 5, in which the heat exchange conduits forming the bubble caps are connected in series into one heat exchange coil, and in which the heat exchange conduits forming the trough members are all connected into a second heat exchange coil.

7. Apparatus as defined in claim 5, together with means for introducing liquid uniformly into the troughs at one end thereof, and means positioned at the other end thereof for maintaining a predetermined liquid level thereon.

8. A bubble tray structure including a horizontal row of elongated trough members with adjacent trough-like members spaced from each other to provide a vapor riser therebetween, a bubble cap over each vapor riser having a skirt extending into the trough members adjacent the riser, said bubble cap including a tubular heat exchange conduit for the passage of a fluid heat exchange medium.

9. A bubble tray structure comprising a plurality of channel members forming the tray proper with adjacent channel members spaced from each other to provide vapor risers, and a bubble cap over each of the vapor risers also comprising a channel member mounted in inverted position with respect to said first mentioned channel members, each of said bubble caps including an integrally constructed tubular conduit for the passage of a heat exchange medium.

10. In a heat exchange apparatus including a plurality of heat transfer sections for indirect heat exchange between fluids, an improved heat transfer section comprising a horizontal row of spaced trough-like members, a channel cap mounted over each of the spaces between adjacent trough-like members with the skirt of the channel cap projecting into adjacent trough-like members, each of said channel caps including a relatively long integrally constructed tubular conduit for the passage of a heat exchange medium.

11. A bubble tray structure of the channel tray and cap type in which each channel cap is generally A-shaped in cross-section thereby providing a tubular conduit in the top of the cap for the passage of a heat exchange medium.

12. A bubble tray structure of the channel tray and cap type in which each channel member is generally A-shaped in cross section thereby providing a conduit in the top of each cap and in the bottom of each tray channel member for the passage of a heat exchange medium.

DAVID G. BRANDT.